United States Patent
Lu et al.

(10) Patent No.: US 9,256,210 B2
(45) Date of Patent: Feb. 9, 2016

(54) SAFE METHOD FOR CARD ISSUING, CARD ISSUING DEVICE AND SYSTEM

(75) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 369 days.

(21) Appl. No.: 13/824,529

(22) PCT Filed: Nov. 24, 2011

(86) PCT No.: PCT/CN2011/082851
§ 371 (c)(1),
(2), (4) Date: Mar. 18, 2013

(87) PCT Pub. No.: WO2012/072001
PCT Pub. Date: Jun. 7, 2012

(65) Prior Publication Data
US 2013/0176103 A1    Jul. 11, 2013

(30) Foreign Application Priority Data
Nov. 30, 2010   (CN) .......................... 2010 1 0573422

(51) Int. Cl.
*G06K 7/00* (2006.01)
*G05B 1/01* (2006.01)
*H04L 9/08* (2006.01)
*H04L 9/32* (2006.01)

(52) U.S. Cl.
CPC ............... *G05B 1/01* (2013.01); *H04L 9/0822* (2013.01); *H04L 9/0825* (2013.01); *H04L 9/321* (2013.01); *H04L 9/3234* (2013.01)

(58) Field of Classification Search
USPC ......................................... 235/375, 379–381
See application file for complete search history.

(56) References Cited

U.S. PATENT DOCUMENTS 5,592,400 A        1/1997  Sasou et al.
2006/0049243 A1*   3/2006  Sakamura et al. ............ 235/380

* cited by examiner

*Primary Examiner* — Matthew Mikels
(74) *Attorney, Agent, or Firm* — Hammer & Associates, P.C.

(57) ABSTRACT

A safe method for card issuing, a card issuing device and system, which relate to the technical field of information security and solve the problem of low efficiency in existing card issuing methods. The embodiment of the safe method for card issuing in the present invention comprises: a managing card and a card issuing device performing a check and certification for card issuing; the card issuing device sending in sequence a card operating system download command sequence to at least one user card, and instructing the at least one user card to download the card operating system according to the card operating system download command sequence; the card issuing device activating the card operation system downloaded onto the at least one user card. The embodiments of the present invention are mainly used in various solutions which require card issuing technology, such as card issuing for public transport systems, and card issuing for bank cards and access cards.

17 Claims, 8 Drawing Sheets

SAFE METHOD FOR CARD ISSUING, CARD ISSUING DEVICE AND SYSTEM

TECHNICAL FIELD

The invention relates to information security technical field, and more particularly to a safe method for card issuing, a card issuing device and a card issuing system.

PRIOR ART

A smart key device is a portable and mobile hardware device with a micro-processor. The smart key device builds connection with a host computer via data communication interface of the host computer, and the processor inside the smart key device generally uses a secure chip to realize functions, such as key generation, secure key storage and presetting encryption algorithm by using its built-in secure mechanism. The operation related to the key is performed completely inside the smart key device; therefore, the smart key device has higher security.

At present, all kinds of public-used popular cards generally belong to smart key device. The method for issuing card in the prior art is with such a solution that a developer writes a set of program, the program reads chip operating system in a managing card and sends the chip operating system to a user card, then the card issuing operation of the user card is completed. Then the user card can be used conveniently.

In the process of using a secure card issuing system in the prior art, inventors find that at least following problems exist in the prior art. The card issuing method in the prior art requires programming a set of program independently, which has no generality and leads to lower efficiency of issuing card; in addition, the process of issuing card in the prior art does not perform any verification on the managing card and a card user, which may result in issuing spare user cards without authorization and leaking unauthorized user cards so as to threat the security of the confidential information.

SUMMARY OF THE INVENTION

Embodiments of the present invention provide a secure card issuing method, a safe card issuing device and a safe card issuing system thereof, which improve card issue efficiency.

In order to achieve purpose above, the embodiments of the present invention apply following technical solutions:

A secure card issuing method, comprising following steps:

(1) a card issuing device receiving identity information input by a user and verifying the identity information by a managing card;

(2) after the managing card verifying the identity information successfully, the card issuing device performing interactive verification with the managing card;

(3) after the card issuing device performing interactive verification with the managing card successfully, the card issuing device obtaining session key from the managing card;

(4) the card issuing device processing chip operating system downloaded command file data of the managing card with the session key;

(5) the card issuing device parsing the chip operating system downloaded command file data to obtain a chip operating system downloaded command sequence;

(6) the card issuing device sending the chip operating system downloaded command sequence to at least one user card and instructing the at least one user card to download the chip operating system according to the chip operating system downloaded command sequence; and (7) the card issuing device activating the chip operating system of the at least one user card.

A card issuing device, comprising a checking unit configured to receive identity information input by a user and verify the identity information by a managing card;

a first verifying unit configured to perform interactive verification between the card issuing device and the managing card after the managing card verifies the identity information successfully;

a second obtaining unit configured to obtain session key from the managing card after the interactive verification between the card issuing device and the managing card is successful;

a first obtaining unit comprising a processing module configured to process chip operating system downloaded command file data in the managing card with the session key and a parsing module configured to parse the chip operating system downloaded command file data to obtain a chip operating system downloaded command sequence;

a sending unit configured to successively send the chip operating system downloaded command sequence to at least one user card and instruct the at least one user card to download chip operating system according to the chip operating system downloaded command sequence; and an activating unit configured to activate the chip operating system downloaded to the at least one user card.

A secure card issuing system, comprising a card issuing device, a managing card and at least one user card, wherein the managing card is configured to provide a chip operating system downloaded command sequence, verify identity information input by a user and perform interactive verification with the card issuing device;

the card issuing device is configured to receive the identity information input by the user and verify the identity information by the managing card; after the identity information is verified successfully by the managing card, the card issuing device is configured to perform interactive verification with the managing card; after the interactive verification between the card issuing device and the managing card is successful, the card issuing device is configured to obtain session key from the managing card; the card issuing device is configured to process chip operating system downloaded command file data in the managing card with the session key and parses the chip operating system downloaded command file data to obtain the chip operating system downloaded command sequence; the card issuing device is configured to send the chip operating system downloaded command sequence to at least one user card and activate chip operating system of the at least one user card; and the user card is configured to download the chip operating system according to the chip operating system downloaded command sequence.

The embodiment of the present invention provides a secure card issuing system; when card issue is required, a card issuing device obtains a chip operating system downloaded command sequence from a managing card and sends the chip operating system downloaded command sequence to at least one user card successively in such a way that the at least one user card can perform download operation according to instruction of the chip operating system downloaded command sequence. Because the chip operating system downloaded command sequence can be send to a plurality of user cards in batch in the embodiment of the present invention, the plurality of user cards can download the chip operating system so as to complete the card issuing operation of the user card in batch. Comparing with the solution that the card issue is completed by programming of developers in the prior art, the embodiment of the present invention improves card issue efficiency by applying the card issuing device.

BRIEF DESCRIPTION OF THE ACCOMPANYING DRAWINGS

In order to clearly illustrate the technical solutions of the present invention or the prior art, following are the figures required for the description of the present invention or the prior art. Obviously, these figures depict some embodiments of the present invention for the purpose of illustration only. Those skilled in the art will readily obtain the other figures in accordance with these figures without any creative effort.

DETAILED DESCRIPTION OF THE PRESENT INVENTION

The technical solutions of the embodiments of the disclosure are described in a clear and complete manner in association with the accompanying drawings as follows. Apparently, the described embodiments are merely a part of, rather than, all embodiments of the disclosure. Based on the described embodiments of the disclosure, other embodiments obtained by those skilled in the art without conducting inventive step should fall into the scope of the disclosure.

Embodiment 1

In order to make the purpose, technical solution and advantages of the disclosure more clear, the method and system provided by the embodiments of the present invention are further illustrated in details in conjunction with the embodiments and the accompanying drawings.

Figure 1:
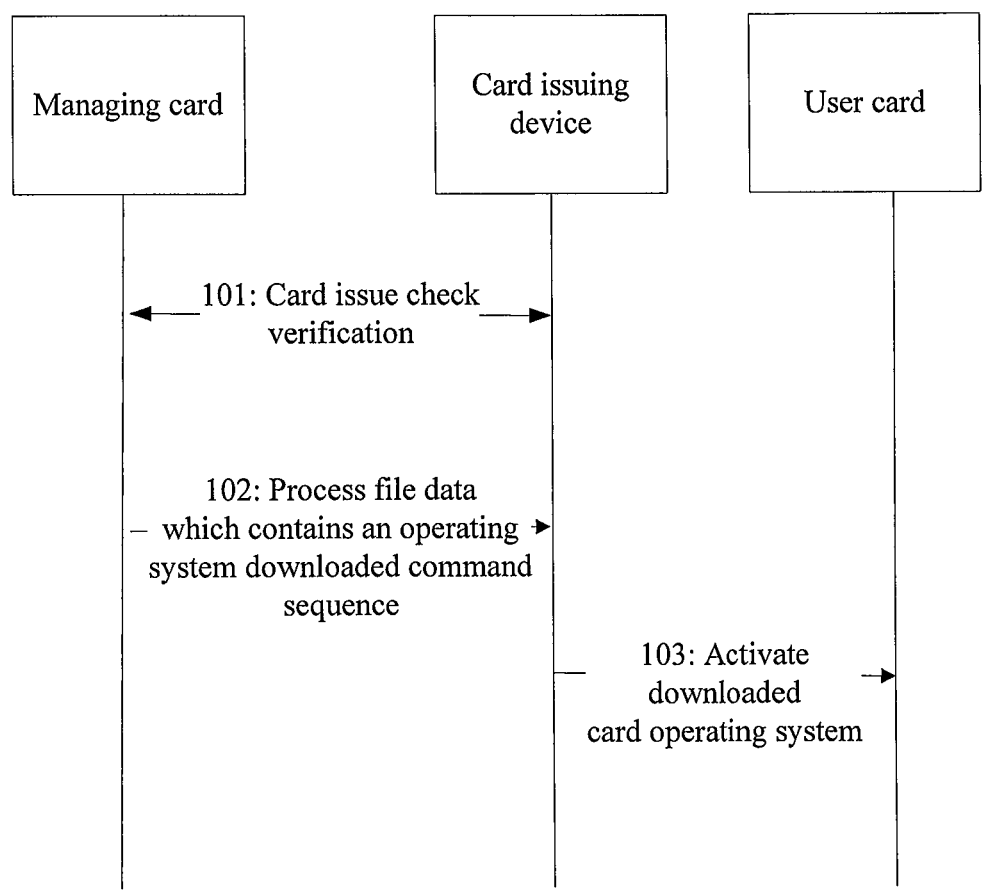
FIG. 1 is a flow chart of a secure card issuing method in embodiment 1 of the present invention.

The present embodiment 1 provides a basic method for implementing issuing card securely. Shown by FIG. 1, specific steps of the method as follows:

Step 101, a managing card and a card issuing device perform card issue check; the card issuing device receives identity information input by a user and verifies the identity information by the managing card; after the identity information is verified by the managing card successfully, internal verification and external verification is performed between the card issuing device and the managing card;

In Step 101 of the present embodiment, process of verifying the identity information specifically includes Steps 201 to 201-1 of embodiment 2; process of internal verification between the card issuing device and the managing card specifically includes Steps 202 to 202-1 of embodiment 2; process of external verification between the card issuing device and the managing card specifically includes Steps 203 to 203-2 of embodiment 2.

Step 102, after the internal verification and the external verification between the card issuing device and the managing card is successful, the card issuing device processes file data containing a chip operating system downloaded command sequence in the managing card; the file data specifically includes session key, configuration file data, user card verification command file data and chip operating system downloaded command file data;

In Step 102 of the present embodiment, process of exporting session key by the card issuing device specifically includes Steps 204 to 204-2 in embodiment 2; process of exporting configuration file data by the card issuing device specifically includes Steps 205 to 205-2 of embodiment 2; process of exporting user card verification command file data by the card issuing device specifically includes Steps 206 to 206-5 of embodiment 2; process of exporting chip operating system downloaded command file data by the card issuing device specifically includes Steps 207 to 207-6 of embodiment 2.

Step 103, the card issuing device obtains the chip operating system downloaded command sequence by parsing chip operating system downloaded command file data with the session key. The card issuing device sequentially sends chip operating system downloaded command sequence to at least one user card and instructs at least one user card to download chip operating system according to the chip operating system downloaded command sequence and activates the downloaded chip operating system of the at least one user card.

In Step 103 of the present embodiment, process of downloading chip operating system includes Steps 209 to 209-2 of embodiment 2; process of activating the chip operating system of the user card includes Steps 210 to Steps 210-3 of embodiment 2.

Embodiment 2

Figure 2A:
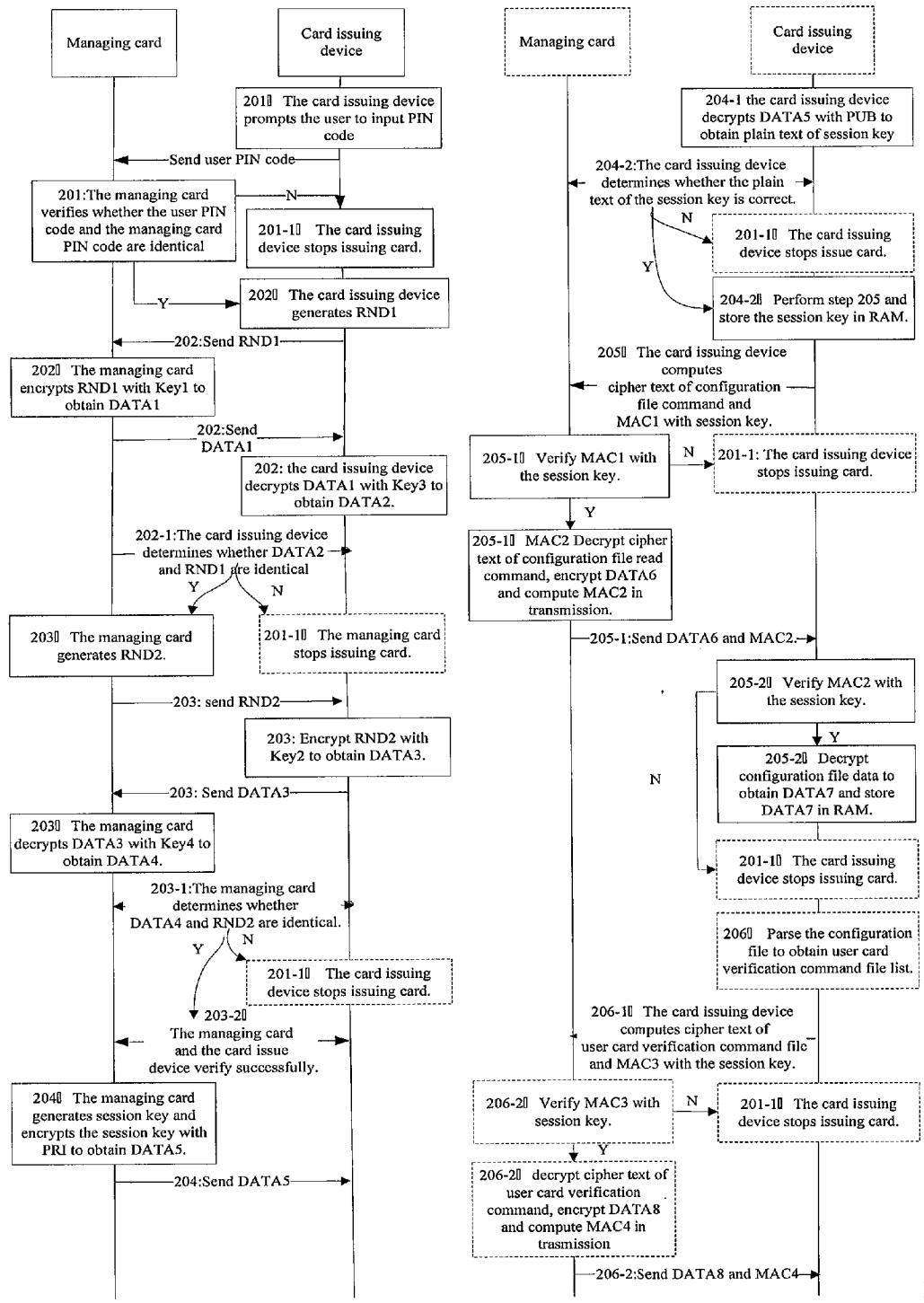
FIG. 2a is a flow chart of a secure card issuing method in embodiment 2 of the present invention.
Figure 2B:
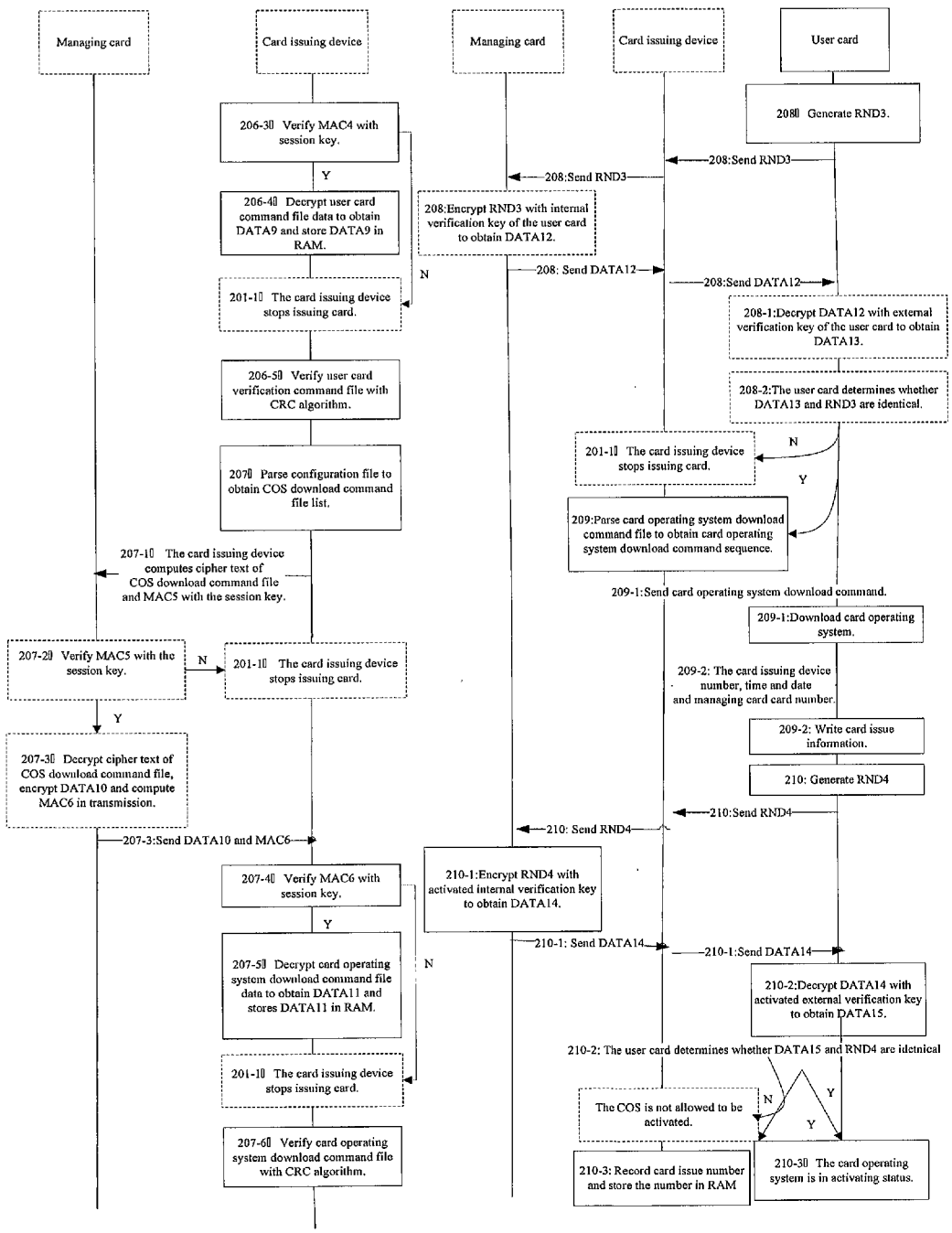
FIG. 2b is a subsequent flow chart of FIG. 2a of the secure card issuing method in embodiment 2 of the present invention.

The present embodiment 2 provides an implementing method for issuing card securely. Shown by FIG. 2a and FIG. 2b, specific steps of the method as follows:

Step 201, a card issuing device prompts a user to input PIN code and sends the PIN code input by the user to a managing card; the managing card verifies whether the PIN code input by the user and a PIN code of the managing card are identical; if yes, go to Step 202; otherwise go to Step 201-1;

Step 201-1, the card issuing device stops issuing card.

Process of Steps 201 to 201-1 of the present embodiment specifically includes Steps 301 to 301-3 of embodiment 3.

Step 202, the card issuing device generates a random number RND1 and sends the generated random number RND1 to the managing card; the managing card encrypts the random number RND1 by using an internal card issue verification key (Key1) of the managing card to obtain data DATA1 and sends the data DATA1 to the card issuing device; similarly, the card issuing device decrypts the data DATA1 by using an external card issue verification key (Key3) of the card issuing device to obtain data DATA2;

Step 202-2, the card issuing device determines whether DATA2 and the RND1 are identical, if yes, go to Step 203; otherwise go to Step 201-1;

process of Steps 202 to 202-1 of the present embodiment specifically includes Steps 302 to Steps 302-7 of embodiment 3.

Step 203, the managing card generates a random number RND2 and sends the generated random number RND2 to the card issuing device; the card issuing device encrypts the random number RND2 by using the internal card issuing key (Key 2) of the card issuing device to obtain data DATA3 and sends the data DATA3 to the managing card;

Similarly, the managing card decrypts the data DATA3 by using an external card issuing verification key (Key 4) of the managing card to obtain data DATA4;

Step 203-1, the managing card determines whether the DATA 4 and the RND2 are identical, if yes, go to Step 203-2, otherwise, go to Step 201-1;

Step 203-2, after the card issuing device and the managing card verify with each other successfully, the managing card obtains a card issuing private key, a user card internal verification key, privilege of using internal activating verification key of the managing card;

Process of Steps 203 to 203-2 of the present embodiment specifically includes Steps 303 to 303-6 of embodiment 3.

Step 204, the managing card generates session key, encrypts the session key with card issuing private key(PRI) to obtain data DATA5 and sends data DATA5 to the card issuing device;

Step 204-1, the card issuing device decrypts data DATA5 with card issuing public key to obtain the plain text of the session key;

Step 204-2, the card issuing device determines whether the format of the plain text of the session key is correct, if yes, goes to Step 205 and stores the session key in random access memory(RAM); otherwise, goes to Step 201-1;

Process of Steps 204 to 204-2 of the present embodiment specifically includes Steps 304 to 304-4 of embodiment 3.

Step 205, the card issuing device computes cipher text of configuration file read command and MAC1 with the session key and sends the cipher text of configuration file read command and MAC1 to the managing card;

Step 205-1, the managing card verifies MAC1 with the session key, decrypts the cipher text of the configuration file read command, encrypts configuration file data DATA6 and computes MAC2 in transmission, and sends DATA6 and MAC2 to the card issuing device;

Step 205-2, the card issuing device verifies MAC2 with the session key, decrypts the configuration file data to obtain configuration file (DATA7) and stores the configuration file in the random access memory (RAM);

Process of Steps 205 to 205-2 of the present embodiment specifically includes Steps 305 to 305-6 of embodiment 3.

Step 206, the card issuing device parses the configuration file, obtains a user card verification command file list and reads the user card verification command file for multiple times according to the sequence of the files in the file list;

Step 206-1: the card issuing device computes cipher text of the user card verification command file and MAC3 with the session key and sends the cipher text of the user card verification file and MAC3 to the managing card;

Step 206-2, the managing card verifies MAC3 with the session key, decrypts the cipher text of the user card verification read command, encrypts the user card verification command file to obtain data DATA8 and computes MAC4 in transmission, and sends data DATA8 and MAC4 to the card issuing device;

Step 206-3, the card issuing device verifies MAC4 with the session key, if the verification is successful, go to Step 206-4; otherwise, go to Step 201-1;

Step 206-4, the card issuing device decrypts the user card command verification file data(DATA8), obtains user card command verification file (DATA9) and stores DATA9 in the random access memory (RAM);

Step 206-5, the card issuing device verifies the user card verification command file with CRC algorithm;

process of Steps 206 to 206-5 of the present embodiment includes Steps 306 to 306-8 of embodiment 3.

Step 207, the card issuing device parses the configuration file, obtains a chip operating system downloaded command file list and read the chip operating system downloaded command file for multiple times according to sequence of the files in the list;

Step 207-1, the card issuing device computes the cipher text of a command for reading chip operating system downloaded command file and MAC5 with the session key, sends the cipher text of the command for reading chip operating system downloaded command file and MAC5 to the managing card;

Step 207-2, the managing card verifies MAC5 with the session key, if the verification is successful, go to Step 207-3; otherwise go to Step 201-1;

Step 207-3, decrypt the cipher text of the command for reading chip operating system downloaded command file, encrypt the chip operating system downloaded command file to obtain data DATA10 and compute MAC6 in transmission, and send data DATA10 and MAC6 to the card issuing device;

Step 207-4, the card issuing device verifies MAC6 with the session key, if the verification is successful, go to Step 207-4; otherwise, go to Step 201-1;

Step 207-5, the card issuing device decrypts the chip operating system downloaded command file data to obtain the chip operating system downloaded command file (DATA11) and stores DATA11 in the random access memory (RAM);

Step 207-6, the card issuing device uses CRC algorithm to verify the chip operating system downloaded command file;

The process of Steps 207 to 207-6 of the present embodiment specifically includes Steps 307 to 307-8 of Embodiment 3.

Step 208, the user card generates a random number RND3, sends RND3 to the managing card via the card issuing device; the managing card encrypts RND3 with a user card internal verification key so as to obtain data DATA12 and sends the data DATA12 to the user card via the card issuing device;

Step 208-1, the user card encrypts DATA12 with a user card external key to obtain DATA13;

Step 208-2, the user card determines whether DATA13 and RND3 are identical, if they are identical, go to Step 209; otherwise, go to Step 201-1;

Process of Steps 208 to 208-2 of the present embodiment specifically includes Steps 308 to 308-5 of embodiment 3;

Depending on the type of a chip, Steps 208 to 208-2 are optional.

Step 209, the card issuing device parses the chip operating system downloaded command file to obtain a chip operating system downloaded command sequence;

Step 209-1, after obtaining the chip operating system downloaded command sequence, the card issuing device sends the chip operating system downloaded command to the user card; the user card performs operation of downloading chip operating system;

Step 209-2, the card issuing device reads its number, time and date, and managing card number to construct data package, and sends the data package to the user card and write card issuing information to the user card;

Process of Steps 209 to 209-2 of the present embodiment includes Steps 309 to 309-3 of embodiment 3.

Step 210, the user card generates a random number RND4, the card issuing device extracts the random number RND4 generated in the user card and sends the random number RND4 to the managing card by an internal activating authenticating command;

Step 210-1, the managing card encrypts RND4 with an internal activating authenticating key (Key6) to obtain data DATA14, the card issuing device extracts the encryption data DATA14 of the managing card and sends DATA14 to the user card by an external activating verification command;

Step 210-2, the user card decrypts DATA14 with an external activating verification key (Key7) to obtain data DATA15; the user card determines whether DATA15 and RND4 are identical, if they are identical, go to Step 210-3; otherwise, the chip operating system of the card is not permitted to be activated;

Step 210-3, the chip operating system of the user card is in activating status; the card issuing device records number of issued cards and stores the number in the RAM for inquiring.

Process of Steps 210 to 210-3 of the present embodiment specifically includes Steps 310 to 310-3 of embodiment 3.

Embodiment 3

Figure 3A:
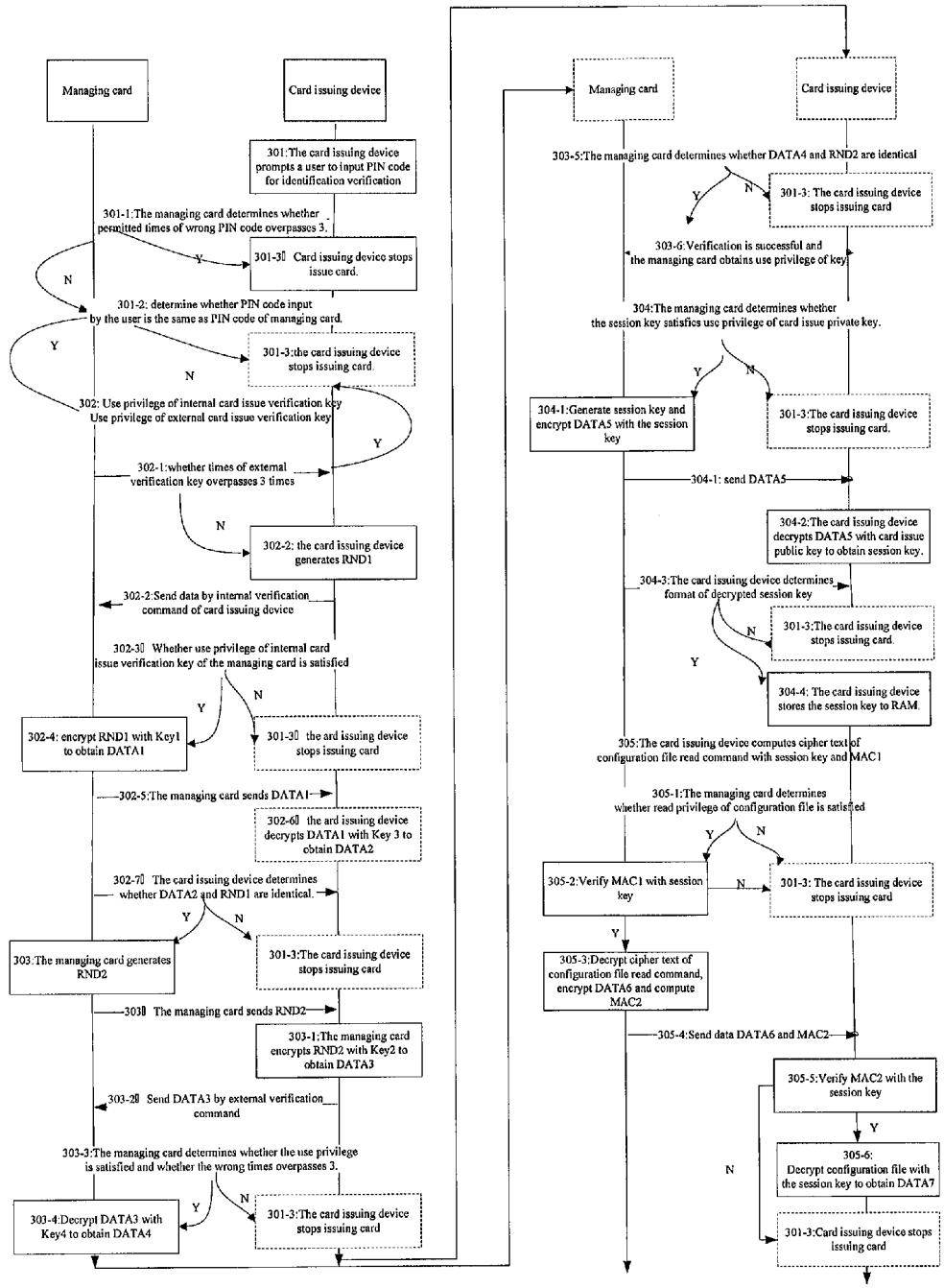
FIG. 3a is a flow chart of a secure card issuing method in embodiment 2 of the present invention.
Figure 3B:
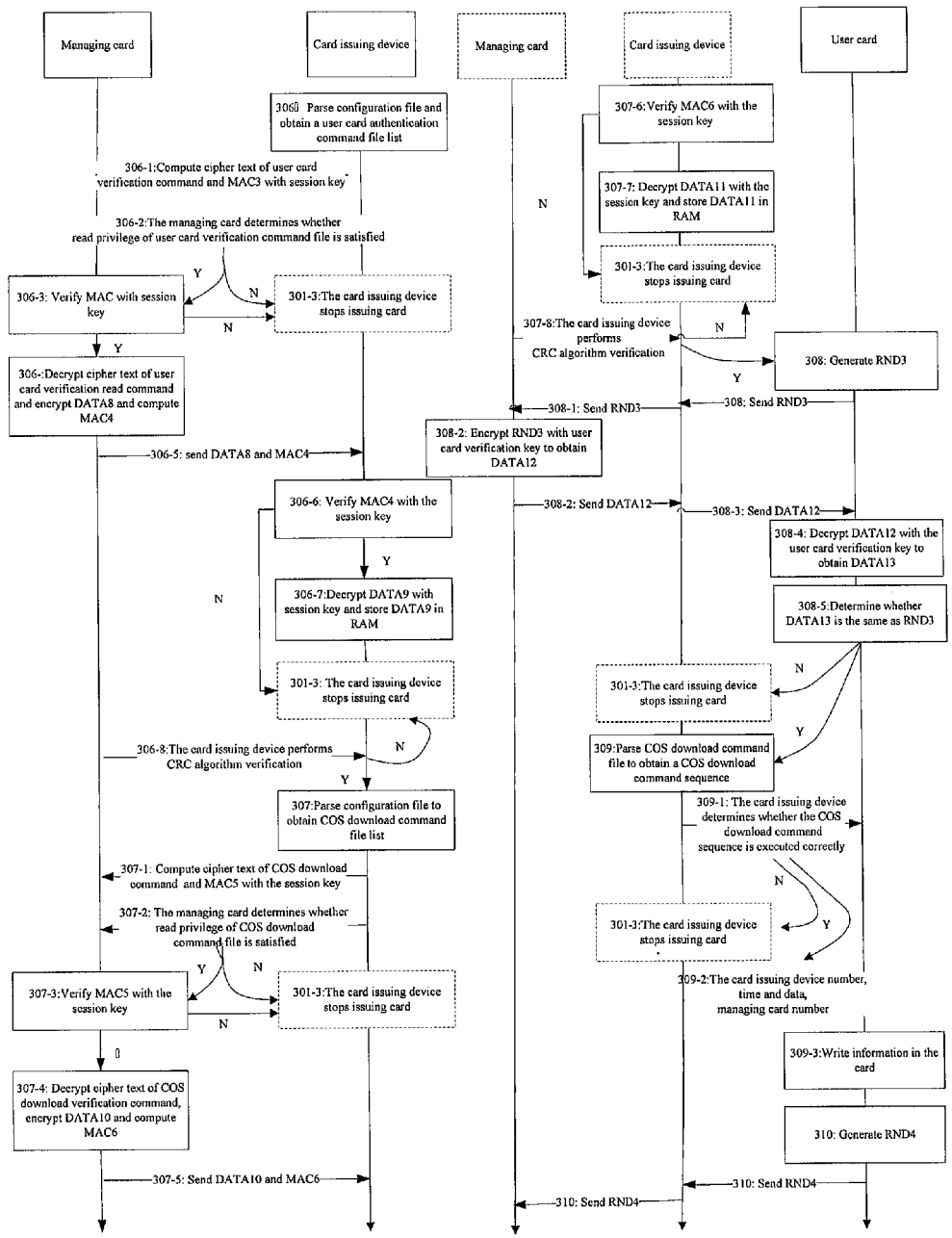
FIG. 3b is a subsequent flow chart of FIG. 3a of the secure card issuing method in embodiment 3 of the present invention.
Figure 3C:
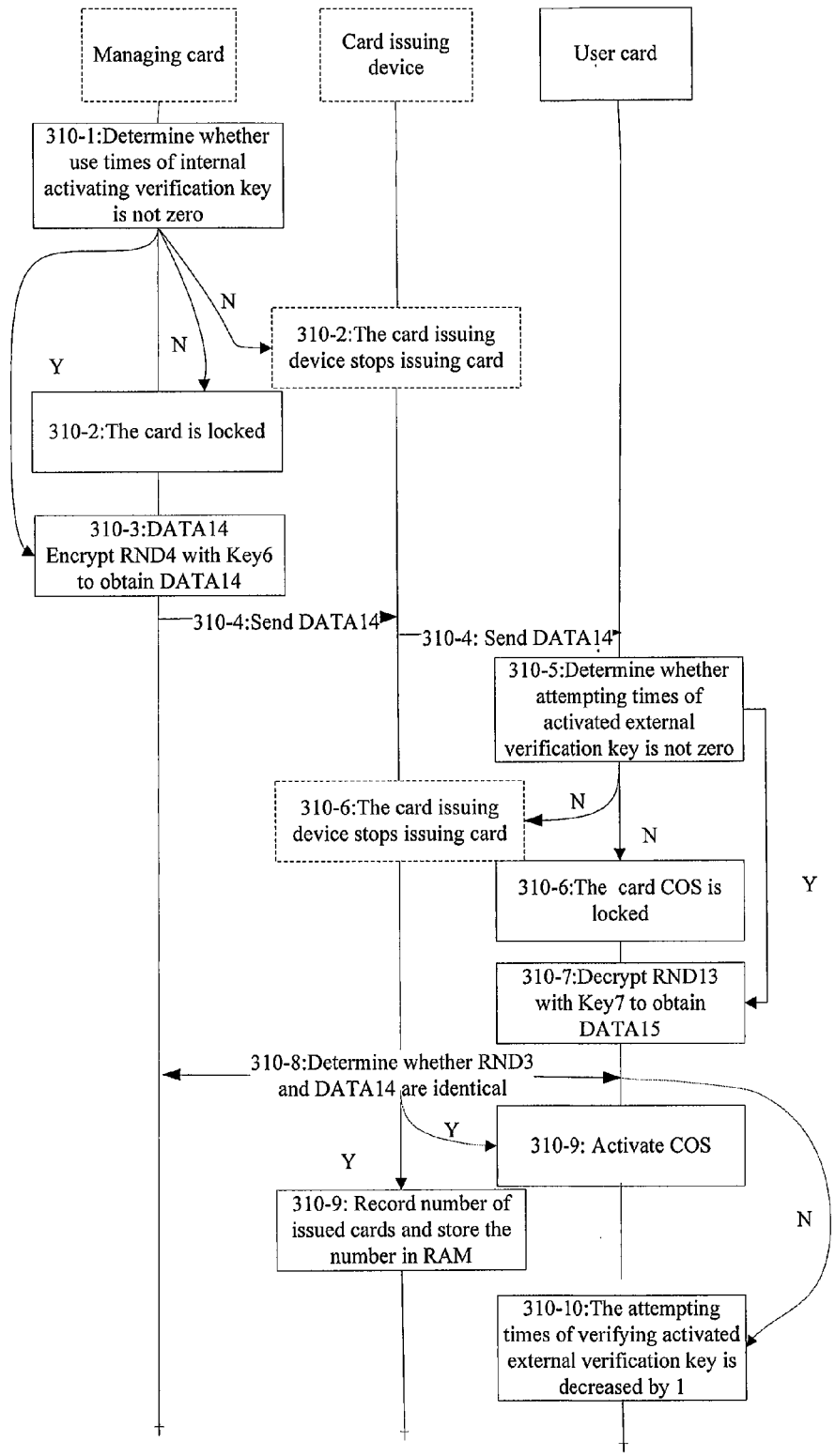
FIG. 3c is a subsequent flow chart of FIG. 3b of the secure card issuing method in embodiment 3 of the present invention.

The embodiment 3 provides an implementing method for secure issuing card. As shown by FIG. 3a, FIG. 3b and FIG. 3c, Steps of the method are as the following:

Step 301, a card issuing device verifies user identity, prompts the user to input PIN (Personal Identification Number)code and sends the input PIN code to a managing card;

Step 301-1, the managing card determines whether times for inputting wrong PIN code is over 3 times, if not, go to Step 301-2; otherwise, go to Step 301-3;

Step 301-2, the managing card determines whether the PIN code input by the user is the same as the PIN code of the managing card, if yes, go to Step 302, if not, go to Step 301-3;

Step 301-3, the card issuing device stops issuing card;

Step 302, the card issuing device obtains privilege of using the internal card issue verification key of the managing card and privilege of using the external card issue verification key of the managing card;

Step 302-1, the card issuing device determines whether the times of wrong external card issue verification key overpass 3 times, if yes, go to Step 301-3; if not, go to Step 302-2;

Step 302-2, the card issuing device generates a random number RND1 and sends RND1 to the managing card by an internal authentication command;

Step 302-3, the card issuing device determines whether the privilege of using the internal card issue verification key of the managing card is satisfied, if yes, go to Step 302-4; if not, go to Step 301-3;

Step 302-4, the managing card encrypts RND1 with Key1 to obtain data DATA1; In Step 302-4 of the present embodiment, the encryption algorithm is 3DES algorithm; specifically, calculation formula is DATA1=3DES (key1, RND1); in this case, Key 1 is the internal card issue verification key of the managing card. If the times of wrong external card issue verification key of the managing card is 3, go to Step 301-3.

Step 302-5, the managing card sends DATA1 to the card issuing device;

Step 302-6, the card issuing device decrypts DATA1 with Key3 to obtain data DATA2;

In Step 302-6 of the present embodiment, the decipher algorithm is 3DES algorithm; specifically, calculation formula is DATA2=3DES$^{-1}$ (Key3, DATA1); in this case, Key 3 is external card issue verification key of the card issuing device.

Step 302-7, the card issuing device determines whether DATA2 is the same as RND1, if yes, DATA2 is correct and the times of wrong external card issue verification key of the card issuing device is set to be 0, go to Step 303; otherwise, the times of wrong external card issue verification key of the card issuing device is increased by 1 and go to Step 301-3;

In Step 302-7 of the present embodiment, the initial value of the wrong times of external card issue verification key of the card issuing device is 0.

Step 303, the managing card generates a random number RND2 and sends RND2 to the card issuing device;

Step 303-1, the card issuing device encrypts RND2 with Key2 to obtain data DATA3;

In Step 303-1 of the present embodiment, the encryption algorithm is 3DES algorithm; specifically the calculation formula is DATA3=3DES (key2, RND2); Key2 in the formula is internal card issue verification key of the card issuing device.

Step 303-2, the card issuing device sends data DATA3 to the managing card by the external verification command;

Step 303-3, the managing card determines whether the use privilege of the external card issue verification key of the managing card is satisfied and whether the times of wrong external card issue verification key of the managing card overpasses 3 times, if yes, go to Step 303-4; otherwise go to Step 303-3;

Step 303-4; the managing card decrypts DATA 3 with Key 4 to obtain data DATA4;

In the Step 303-4 of the present embodiment, the decryption algorithm is 3DES algorithm; specifically, the formula is DATA4=3DES$^{-1}$(Key4, DATA3); Key4 in the formula is external card issue verification key of the managing card.

Step 303-5: the managing card determines whether DATA4 and RND2 are identical; if they are identical, determines DATA4 to be correct and sets the times of wrong external card issue verification key of the managing card to be 0 and go to Step 303-6; otherwise, adds 1 to the times of wrong external card issue verification key of the managing card and go to Step 301-3.

In Step 303-5 of the present embodiment, the initial value of the wrong times of external card issue verification key of the managing card is 0.

Step 303-6: after the card issuing device and the managing card verify with each other successfully, the managing card obtains use privilege of card issuing private key, the user card internal verification key, and the internal activating verification key of the managing card;

Step 304, the managing card determines whether the use privilege of the card issuing private key is satisfied; if yes, go to Step 304-1; otherwise, go to Step 301-3;

Step 304-1: the managing card generates session key, and obtains DATA5 by using card issue private key to encrypt the session key and sends DATA 5 to the card issuing device;

In Step 304-1 of the present embodiment, the algorithm for encryption is RSA encryption algorithm; Specifically, calculation formula is DATA5=RSA (PRI, session); in the formula, PRI is card issuing private key and session is session key.

Step 304-2, the card issuing device decrypts DATA5 with the card issue key to obtain plain text of the session key.

In Step 304-2 of the present embodiment, the algorithm for decryption is RSA decipher algorithm; specifically, calculation formula is session=RSA$^{-1}$ (PUB, DATA5); PUB is card issuing public key.

Step 304-3, the card issuing device determines whether the first byte is 1 of the plain text of the session key after decryption; if the first byte of the plain text is 1, go to Step 304-4; otherwise, go to Step 301-3;

In Step 304-3 of the present embodiment, only if the session key is obtained, can the card issuing device read the configuration file, the user card authentication command file and the chip operating system downloaded command file.

Step 304-4, the card issuing device stores the session key in RAM;

Step 305, the card issuing device uses the session key to compute cipher text of configuration file read command and MAC1, and sends the cipher text of the configuration file read command and MAC1 to the managing card;

In Step 305 of the present embodiment, the cipher text of the configuration file read command=3DES (session, length of the configuration file read command), MAC1=3DES (session, data of the configuration file read command); the session is the session key.

Step 305-1, the managing card receives cipher text of the configuration file read command and MAC1 and determines whether the privilege of reading the configuration file is satisfied, if yes, go to Step 305-2; otherwise, go to Step 301-3;

Step 305-2, the managing card verifies MAC1 with the session key, if verification is successful, go to Step 305-3; otherwise, go to Step 301-3;

In the Step 305-2 of the present embodiment, the algorithm for verifying MAC1 is 3DES algorithm; specifically, calculation formula is: verifying MAC1=3DES (session, data of the configuration file read command).

Step 305-3, the managing card uses the session key to decrypt the cipher text in the configuration file read command, encrypts configuration file data DATA6 and computes MAC2 in transmission;

In Step 305-3 of the present embodiment, the algorithm of encryption/decryption is 3DES algorithm, DATA6=3DES (session, configuration file), MAC2=3DES (session, DATA6), decrypting cipher text of configuration file read command=$3DES^{-1}$ (session, length of the configuration file read command); the session is session key.

Step 305-4, the managing card sends data DATA6 and MAC2 to the card issuing device;

Step 305-5, the card issuing device uses the session key to verify MAC2, if the verification is successful, go to Step 305-6, otherwise, go to Step 301-3;

In Step 305-5 of the present embodiment, the algorithm for verifying MAC2 is 3DES algorithm, verifying MAC2=3DES (session, DATA6).

Step 305-6, the card issuing device decrypts configuration file data with session key to obtain DATA 7 and stores DATA7 to RAM;

In Step 305-6 of the present embodiment, the algorithm of decryption is 3DES algorithm; Specifically, calculation formula is DATA7=$3DES^{-1}$ (session, DATA6), the session is session key, DATA 7 is configuration file.

Step 306, the card issuing device parses the configuration file to obtain a user card authentication command file list, which contains information such as file ID, size and CRC check value, etc., and reads the user card authentication command file by multiple times according to the arrangement sequence of files in the list.

Step 306-1, the card issuing device uses session key to calculate cipher text of the user card authentication command file and MAC3 and sends the cipher text of the user card authentication command file and the MAC3 to the managing card;

In Step 306-1 of the present embodiment, reading the cipher text of the user card authentication command=3DES (session, length of user card authentication read command), MAC3=3DES (session, data of reading user card authentication read command).

Step 306-2, after receiving cipher text of the user card authentication read command and MAC3, the managing card determines whether the cipher text of the user card authentication command and MAC3 satisfy the privilege of reading the user card authentication command file, if yes, go to Step 306-3, otherwise, go to Step 301-3;

Step 306-3, the managing card uses the session key to verify MAC3, if the verification is successful, go to Step 306-4, otherwise, go to Step 301-3;

In Step 306-3 of the present embodiment, the algorithm for verifying MAC3 is 3DES algorithm; Specifically, calculation formula is: verifying MAC3=3DES (session, data of reading user card authentication command).

Step 306-4, the managing card decrypts the cipher text of user card authentication read command with the session key and encrypts the user card authentication command file to obtain data DATA8 and computes MAC4 in transmission;

In Step 306-4 of the present embodiment, the algorithm for encryption is 3DES algorithm; specifically, calculation formula is: decrypting the cipher text of user card authentication read command=$3DES^{-1}$ (session, length of user card authentication read command), DATA8=3DES (session, user card command authentication file), MAC4=3DES (session, DATA8); the session is session key.

Step 306-5, the managing card sends DATA8 and MAC4 to the card issuing device;

Step 306-6, the card issuing device verifies MAC4 with the session key, if the verification is successful, go to Step 306-7, otherwise, go to Step 301-3;

In Step 306-6 of the present embodiment, the algorithm for verifying MAC4 is 3DES algorithm; Specifically, the calculation formula is MAC4=3DES (session, DATA8).

Step 306-7, the card issuing device uses the session key to decrypt the data of the user card command authentication file to obtain DATA9 and stores DATA9 in RAM;

In Step 306-7 of the present embodiment, the algorithm for decryption is 3DES algorithm; Specifically, calculation formula is DATA9=$3DES^{-1}$ (session, DATA8); the session is session key, DATA9 is the user card command authentication file.

Step 306-8, the card issuing device performs CRC algorithm verification on the user card authentication command file; if the verification is successful, go to Step 307; otherwise, go to Step 303-3;

In Step 306-8 of the present embodiment, the algorithm of verification is CRC16 algorithm; Specifically, calculation formula is CRC16 (user card authentication command file).

Step 307, the card issuing device parses configuration file to obtain a chip operating system downloaded command file list, which contains information such as file ID, size and CRC check value, etc. and reads the chip operating system downloaded command file by many times according to the arrangement sequence of the files in the list.

Step 307-1, the card issuing device uses the session key to compute the cipher text of the chip operating system download read command file and MAC5 and sends the cipher text and MAC5 to the managing card;

In Step 307-1 of the present embodiment, the cipher text of a command for reading chip operating system downloaded command file=3DES (session, length of the chip operating system download read command file), MAC5=3DES (session, cipher text of the command for reading chip operating system downloaded command file), in which the session is the session key.

Step 307-2, the managing card determines whether the privilege of reading the chip operating system downloaded command file is satisfied, if yes, go to Step 307-3, otherwise, go to Step 301-3;

Step 307-3, the managing card uses the session key to verify MAC5; if the verification is successful, go to Step 307-4; otherwise, go to Step 301-3;

In Step 307-3 of the present embodiment, the algorithm for verifying MAC5 is 3DES algorithm; specifically, the calculation formula is: MAC5=3DES (session, cipher text of the command for reading chip operating system downloaded command file).

Step 307-4, the managing card uses the session key to decrypt the cipher text of the chip operating system download read command file, encrypt the chip operating system downloaded command file to obtain data DATA10 and compute MAC6 in transmission;

In Step 307-4, the algorithm for encryption is 3DES algorithm; specifically, calculation formula is: decrypting cipher text of the chip operating system download read command file=3DES−1 (session, length of the chip operating system download read command file), DATA10=3 DES (session, chip operating system downloaded command file), MAC6=3DES (session, chip operating system downloaded command file data), the session is session key.

Step 307-5: the managing card sends DATA10 and MAC6 to the card issuing device;

Step 307-6, the card issuing device uses the session key to verify MAC6, if the verification is successful, go to Step 307-7, otherwise, go to Step 301-3;

In Step 307-6 of the present embodiment, the algorithm for verifying MAC6 is 3DES algorithm, specifically, calculation formula is: 3DES (session, DATA10).

Step 307-7, the card issuing device decrypts cipher text of chip operating system downloaded command file data with the session key to obtain DATA11 and stores DATA11 to RAM;

In Step 103-27 of the present embodiment, the algorithm used for decryption is 3DES algorithm; specifically, calculation formula is DATA11=3DES$^{-1}$ (session, DATA10); the session is session key, DATA11 is the chip operating system downloaded command file.

Step 307-8, the card issuing device performs CRC algorithm verification on the chip operating system downloaded command file, if the verification is successful, go to Step 309, otherwise, go to Step 301-3.

In Step 307-8 of the present embodiment, the algorithm for verification is CRC16 algorithm; specifically, calculation formula is CRC16 (chip operating system downloaded command file).

Step 308, the user card generates a random number RND3 and sends RND3 to the card issuing device;

In Step 308 of the present embodiment, the managing card and the user card verification is performed before downloading the chip operating system; only if the user card verification is performed, downloading the chip operating system to the user card is allowed.

Step 308-1: the card issuing device receives data RND3 and sends RND3 to the managing card;

Step 308-2: the managing card encrypts RND3 with the user card internal verification key to obtain data DATA12 and sends DATA12 to the card issuing device;

In Step 308-2 of the present embodiment, the encryption algorithm is 3DES algorithm; specifically, calculation formula is DATA12=3DES (Key4, RND3); Key 4 is the user card internal verification key.

Step 308-3, the card issuing device receives data DATA12 and sends DATA12 to the user card by the user card authentication command;

Step 308-4, the user card decrypts DATA12 with the user card external verification key to obtain DATA 13;

In Step 308-4 of the present embodiment, algorithm for decryption is 3DES algorithm; specifically, calculation formula is DATA13=3DES$^{-1}$ (Key4, DATA12); Key 4 is user card external verification key.

Step 308-5, the user card determines whether DATA13 and RND3 are identical, if they are identical, go to Step 309, otherwise go to Step 301-3;

Depending on chip type, Steps 308 to 308-5 is optional;

Step 309: the card issuing device parses the chip operating system downloaded command file to obtain a chip operating system downloaded command sequence;

In Step 105 of the present embodiment, the chip operating system downloaded sequence contains command packet of every command of the user card or the managing card and the responding packet and status code which are required to be returned.

Step 309-1, the card issuing device sends the chip operating system downloaded command sequence to the user card; if the command sequence is executed correctly, go to Step 309-2, otherwise go to Step 301-3;

In Step 309-1 of the present embodiment, the card issuing device will not enter process of activating verification until the chip operating system is downloaded successfully.

Step 309-2, the card issuing device reads its own number, time and date, card number of the managing card to construct a first data package;

Step 309-3, the card issuing device writes the information in the first data package into the user card;

Step 310, the user card generates a random number RND4; the card issuing device extracts the random number RND4 generated in the user card and sends RND4 to the managing card by the internal activating verification command;

In Step 310 of the present embodiment, the random number RND4 is a character with 4 bytes;

Step 310-1, the managing card determines whether the times of using the internal activating verification key of the managing card is not zero; if the times is not zero, go to Step 310-3, otherwise, go to Step 310-2;

In Step 310-1 of the present embodiment, the times of using the internal activating verification key of the managing card is an actual number of issued cards.

Step 310-2, the managing card is locked, the card issuing device stops issuing card;

Step 310-3, the managing card encrypts RND4 with Key6 to obtain data DATA14; the times of using the internal activating verification key of the managing card is decreased by 1;

In Step 310-3 of the present embodiment, the encryption algorithm is 3DES algorithm; specifically, calculation formula is DATA14=3DES (key6, RND4); Key 6 in the formula is the internal activating verification key of the managing card.

Step 310-4, the card issuing device extracts encrypted data DATA14 of the managing card and sends DATA14 to the user card by the external activating verification command.

Step 310-5, the user card determines whether attempting verification times of the external activating verification key of the user card is not zero, if the times is not zero, go to Step 310-7; otherwise, go to Step 310-6;

In Step 310-5 of the present embodiment, the default value of the attempting verification times of the external activating verification key of the user card is 3.

Step 310-6, the user card sends 6983 instruction to the card issuing device; the card issuing device stops issuing card; COS activation of the user card is failed;

In Step 310-6 of the present embodiment, 6983 instruction is the key locking instruction;

Step 310-7, the user cars decrypts DATA14 with Key7 to obtain data DATA15;

In Step 310-7 of the present embodiment, decryption algorithm is 3DES algorithm; specifically, the formula is DATA15=3DES$^{-1}$ (KEY7, DATA14), the Key7 in the formula is the external activating verification key of the user card.

Step 310-8, the user card determines whether DATA15 and RND4 are identical, if they are identical, go to Step 310-9, otherwise, go to Step 310-10;

Step 310-9, the COS of the user card is in activating status; the user card sends 9000 instruction to the card issuing device, the card issuing device records number of issued cards and stores the number in RAM for inquiring.

In Step 310-9 of the present embodiment, 9000 instruction is of successful execution command;

Step 310-10, the attempting verification times of external activating verification key of the user card is decreased by 1; the user card sends 63CX instruction to the card issuing device, the card issuing device activates card unsuccessfully and stops issuing card;

In Step 310-10 of the present embodiment, 63CX instruction refers to failed activating operation; X represents rest attempt verification times of the external activating verification key; When the attempt verification times of the external activating verification key of the user card is zero, COS of the card is not allowed to be activated.

Embodiment 4

Figure 4:
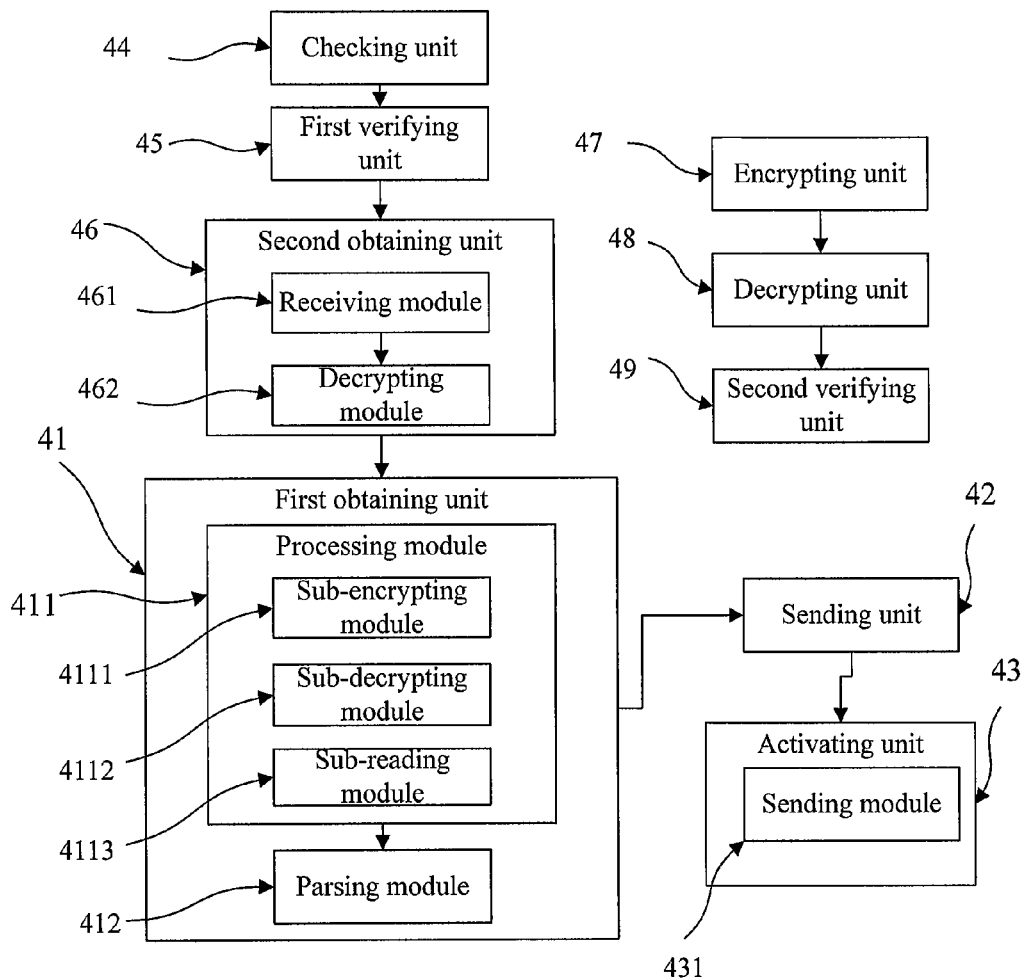
FIG. 4 is a structural diagram of a card issuing device in embodiment 4 of the present invention.
Figure 5:
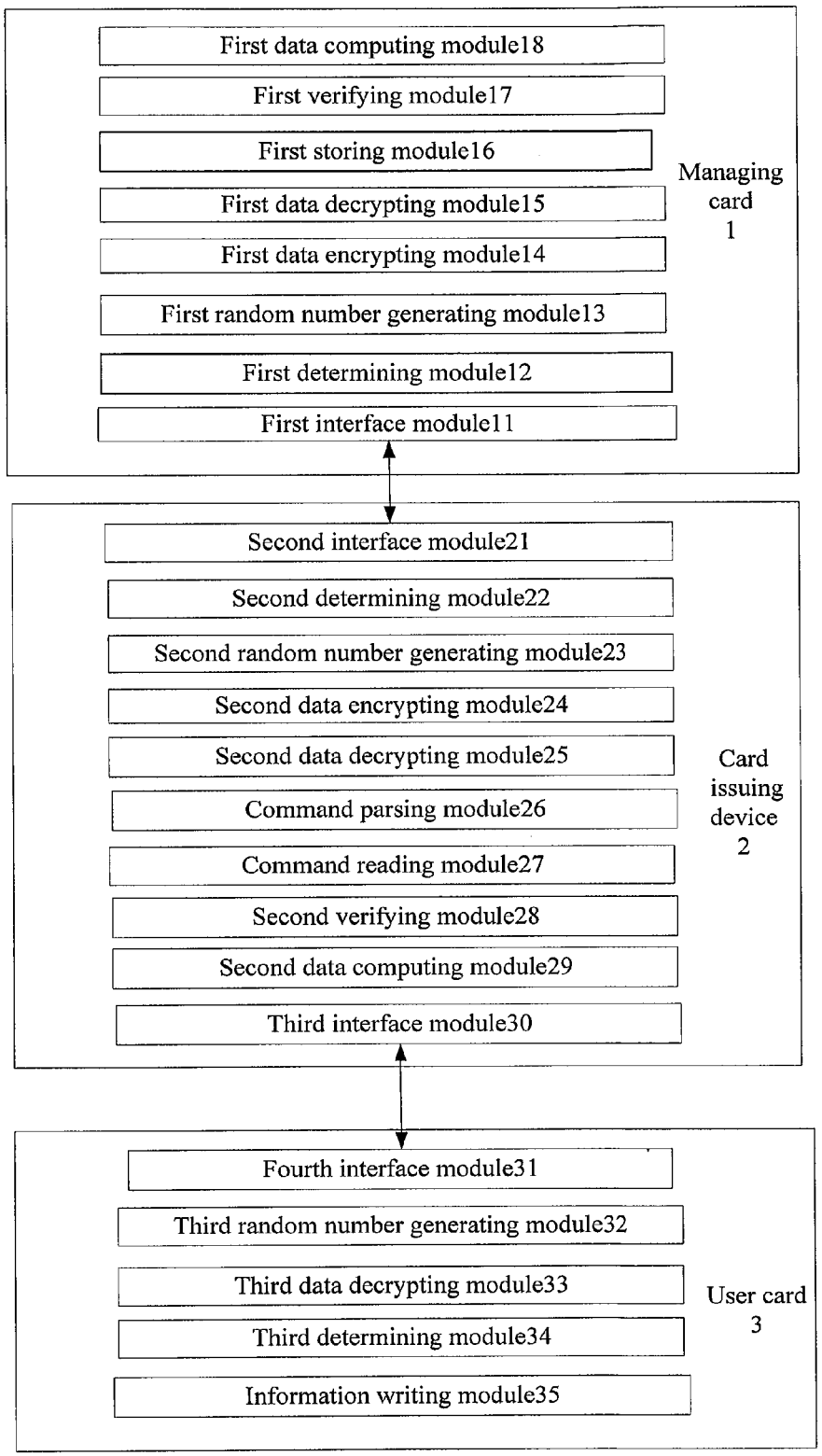
FIG. 5 is a structural diagram of a card issuing device in embodiment 5 of the present invention.

The embodiment 4 of the present invention provides a card issuing device. As shown by FIG. 4, the card issuing device includes a first obtaining unit 41, a sending unit 42 and an activating unit 43. In order to assure the security of the card, the embodiment of the present invention can apply the following form of verification, i.e. a checking unit 44, a first verifying unit 45 and a second obtaining unit 46 are added to the card issuing device.

In this case, the checking unit 44 is configured to receive identity information input by a user and verify the identity information by a managing card; a first verifying unit 45 is configured to perform interactive verification between the card issuing device and the managing card after the managing card verifies the identity information successfully; the second obtaining unit 46 obtains session key from the managing card after the card issuing device and the managing card verify with each other successfully.

The first obtaining unit 41 includes a processing unit 411 configured to use the session key to process chip operating system downloaded command file data of the managing card; and a parsing module 412 configured to parse the chip operating system downloaded command file data to obtain a chip operating system downloaded command sequence.

The sending unit 42 is configured to send the chip operating system downloaded command sequence to at least one user card in order and instruct at least one user card to download chip operating system according to the chip operating system downloaded command sequence; the activating unit 43 is configured to activate the chip operating system downloaded to the at least one user card.

The second obtaining unit 46 in the present embodiment can apply the following solution. Specifically, the second obtaining unit 46 includes a receiving module 461 and a decrypting module 462. In this case, the receiving module 461 is configured to receive the session key which is encrypted with card issuing private key by the managing card and the session key is generated by the managing card; the decrypting module 462 is configured to use card issuing public key to obtain the session key.

A reading module of the present embodiment 4 of the invention can include a sub-encrypting module 4111, a sub-decrypting module 4112 and a sub-reading module 4113.

In this case, the sub-encrypting module 4111 is configured to encrypt configuration file read command with the session key and send the encrypted command to the managing card; the managing card performs decryption with the session key to obtain the configuration file read command and obtains configuration file data according to the configuration file read command; The managing card further encrypts the configuration file data with the session key and sends the encrypted data to the card issuing device; The sub-decrypting module 4112 is configured to decrypt chip operating system downloaded command file list in the obtained configuration file data which is obtained by decryption with the session key; the sub-reading module 4113 is configured to read the chip operating system downloaded command file data from the managing card by using the session key according to arrangement sequence in the chip operating system downloaded command file list.

In order to manage number of activated user cards effectively, the activating unit 43 in the embodiment of the present invention further includes a sending module 431 configured to send a random number generated by the user card to the managing card; the activating process is as the following: when the available times of the internal activating verification key for the managing card is larger than 0, encrypt the random number by using the internal activating verification key and send the encrypted random number to the user card; the available times of the internal activating verification key minus 1 simultaneously; when the available times of the external activating verification key for the user card is larger than 0, perform decryption by using the external activating verification key to obtain the random number; the available times of the external activating verification key minus 1 simultaneously; as the user card obtains the random number by decryption which is the same as the generated random number, the user card controls the chip operating system to be in activating status.

In order to assure the security of issuing card, the embodiment of the present embodiment can further apply the following way of verification, i.e. an encrypting unit 47, a decrypting unit 48 and a second verifying unit 49 are added in the card issuing device.

In this case, the encrypting unit 47 is configured to encrypt read command of the user card verification command by using the session key and send the encrypted read command to the managing card; the managing card performs decryption with the session key to obtain the read command of the user card verification command and read the user card verification command file according to the read command; the managing card uses the session key to encrypt the user card verification command file and send the encrypted file to the card issuing device; the decrypting unit 48 is configured to perform decryption with the session key to obtain the user card verification command file; the second verifying unit 49 is configured to verify the user card verification command file; the reading module is configured to read the chip operating system downloaded command file data from the managing card after the user card verification command file is verified successfully.

In order to assure the security of issuing card, the embodiment of the present invention can further adapt following way of verification: the sending unit 82 is further configured to send the random number generated by the user card to the managing card; the managing card encrypts the random number with the internal verification key and sends the encrypted random number to the user card by the card issuing device; the user card decrypts the random number with the external verification key and determines whether the random number obtained by decryption is identical to the generated random number; and when the random number obtained by decryption is identical to the generated random number, the user card downloads the chip operating system according to the chip operating system downloaded command sequence.

Embodiment 5

The embodiment 5 of the present invention provides a secure card issuing system. As shown by FIG. 6, the system includes a managing card 1, a card issuing device 2 and a user card 3.

In the system, the managing card 1 is configured to provide a chip operating system downloaded command sequence, verify the identity information input by the user and perform interactive verification with the card issuing device;

The card issuing device 2 is configured to receive identity information input by the user and verify the identity information by the managing card; after the managing card verifies the identity information successfully, the card issuing device performs interactive verification with the managing card; after the card issuing device and the managing card perform interactive verification successfully, the card issuing device obtains the session key from the managing card; the card issuing device uses the session key to read the chip operating system downloaded command file data from the managing card and parses the chip operating system downloaded command file data to obtain a chip operating system downloaded command sequence; the card issuing device sends the chip operating system downloaded command sequence to at least one user card according to the chip operating system downloaded command sequence in order and activates the chip operating system downloaded to the at least one user card;

The user card 3 is configured to download the chip operating system according to the chip operating system downloaded command sequence.

Specifically, the managing card 1 includes a first interface module 11, a first determining module 12, a first random number generating module 13, a first data encrypting module 14, a first data decrypting module 15, a first storing module 16, a first verifying module 17 and a first data computing module 18;

Specifically, the card issuing device 2 includes a second interface module 21, a second determining module 22, a second random number generating module 23, a second data encrypting module 24, a second data decrypting module 25, a command parsing module 26, a command reading module 27, a second verifying module 28, a second data computing module 29 and a third interface module 30;

Specifically, the user card 3 includes a fourth interface module 31, a third random number generating module 32, a third data decrypting module 33, a third determining module 34 and an information writing module 35;

the first interface module 11 of the managing card 1 is configured to connect the managing card 1 and the card issuing device 2;

a first determining module 12 is configured to determine whether the PIN code input by the user is identical to the PIN code of the managing card;

determine whether the internal/external card verification key of the managing card obtains use privilege after successful verification of PIN code;

specifically, after successful PIN code verification, the internal/external card issue verification key of the managing card obtains use privilege.

Determine whether the configuration file obtains read privilege;

Specifically, after the internal/external card issue verification key of the managing card obtains the use privilege, the status value of use privilege verification satisfied by the card issuing private key is two;

When the status value of use privilege verification satisfied by the card issuing private key is two, the configuration file obtains read privilege.

Determine whether the user card verification command file obtains read privilege;

Specifically, after the internal/external card issue verification key of the managing card obtains the use privilege, the status value of the internal/external verification key of the user card is two;

When the status value by which the internal/external verification key satisfies use privilege is two, the user card verification command file obtains reading privilege.

Determine whether the chip operating system downloaded command file obtains the reading privilege;

Specifically, after the internal/external card issue verification key of the managing card obtains the use privilege, the status value by which the external activating verification key of the user card satisfies the use privilege is two;

When the status value by which the external activating verification key of the user card satisfies the use privilege is two, the chip operating system downloaded command file obtains reading privilege.

Determine whether the use times of the internal activating verification key of the managing card is not zero;

determine whether the random number generated by the first random number generating module 13 is identical to the encrypted data of the first data encrypting module 14;

determine whether the random number generated by the first random number generating module 13 is identical to the decrypted data of the first data decrypting module 15.

The first random number generating module 13 is configured to generate a random number by which the managing card and the card issuing device perform internal verification;

the first data encrypting module 14 is configured to encrypt the session key by the managing card 1 with the card issuing private key;

The managing card 1 uses the session key to encrypt the cipher text of the configuration file read command;

The managing card 1 uses the session key to encrypt the cipher text of the user card verification read command;

The managing card 1 uses the session key to encrypt the cipher text of the chip operating system download read command file;

The managing card 1 uses the internal card issue verification key of the managing card 1 to encrypt the random number generated by the second random number generating module 23 in the card issuing device 2;

The managing card 1 uses the session key to encrypt the configuration file data, the user card verification command file data and the chip operating system downloaded command file data;

The managing card 1 uses the user card verification key to encrypt the random number generated by the first random number generating module 13;

The managing card 1 uses the internal activating verification key of the managing card to encrypt the random number generated by the third random number generating module 32 of the user card 3;

The first data decrypting module 15 is configured to use the external card issue verification key of the managing card by the managing card to decrypt the data encrypted by the second data encrypting module 24 of the card issuing device 2;

The first storing module 16 is configured to be used by the managing card 1 to store the use times of the activating verification key;

the first verifying module 17 is configured to be used by the managing card 1 to verify MAC1 value, MAC3 value and MAC5 value with the session key; the values belong to verifying information;

The first data computing module 18 is configured to be used by the managing card 1 to compute MAC2 value, MAC4 value and MAC6 value with the session key; the values belong to verification information;

The second interface module 21 of the card issuing device 2 is configured to connect the card issuing device 2 and the managing card 1;

the second determining module 22 is configured to be used by the card issuing device to determine whether the time of wrong external card issue verification key overpasses 3 times;

determine whether the format of the decrypted session key is correct;

determine whether the chip operating system download system can be executed correctly;

determine whether the data decrypted by the second data decrypting module 25 and the random number generated by the second random number generating module 23 are identical;

The second random number generating module 23 is configured to generate the random number used for internal/external verification between the managing card 1 and the card issuing device 2;

The second data encrypting module 24 is configured to be used by the card issuing device 2 to encrypt the random number generated by the first random number generating module 13 with the internal card issue verification key of the card issuing device 2;

The second data decrypting module 25 is configured to be used by the card issuing device 2 to decrypt the random number, which is encrypted by the first data encrypting module 14 with the internal card issue verification key of the card issuing device 2;

The card issuing device 2 uses the session key to decrypt the configuration file data which is encrypted by the first data encrypting module 14 of the managing card 1, the user card verification command file data and the chip operating system downloaded command file data;

The card issuing device 2 uses the card issuing public key to decrypt the session key encrypted by the first data encrypting module 14;

The command parsing module 26 is configured to be used by the card issuing device 2 to parse the configuration file data, the user card verification command file data and the chip operating system downloaded command file data;

The command reading module 27 is configured to be used by the card issuing device 2 to read the command parsed by the command parsing module 26;

The card issuing device 2 reads the card issuing device number, managing card number and time date;

The second verifying module 28 is configured to be used by the card issuing device 2 to verify MAC2 value, MAC4 value and MAC6 value with the session key, the values belong to verification information;

The second data computing module 29 is configured to be used by the card issuing device 2 to compute MAC1 value, MAC3 value and MAC5 value; the values belong to verification information;

The third interface module 30 is configured to connect the card issuing device 1 and the user card 3;

The fourth interface module 31 of the user card 3 is configured to connect the user card 3 and the card issuing device 2;

The third random number generating module 32 is configured to perform internal verification between the user card 3 and the managing card 1 to generate the random number;

and is configured to perform internal activating verification between the user card 3 and the managing card 1 to generate the random number;

The third data decrypting module 33 is configured to be used by the user card 3 to decrypted the data, which is encrypted by the first data encrypting module 14 of the managing card 1, with the external card issue verification key of the user card 3;

and is configured to be used by the user card 3 to decrypt the data, which encrypted by the first data encrypting module 14 of the managing card 1, with the user card external activating verification key, The third determining module 34 is configured to be used by the user card 3 to determine whether the decrypted data of the third data decrypting module 33 is identical to the random number of the third random number generating module 32;

determine whether the attempting verification times of the external activating verification key of the user card is not zero;

determine whether the internal/external activating verification between the user card 3 and the managing card is successful;

determine whether the information writing module 35 writes information successfully;

the information writing module 35 is configured to write the information of the command reading module 27 of the card issuing device 2.

The embodiment 5 of the present invention provides a secure card issuing system; when card issue is required, a card issuing device obtains a chip operating system downloaded command sequence from a managing card and sends the chip operating system downloaded command sequence to at least one user card successively in such a way that the at least one user card can perform download operation according to instruction of the chip operating system downloaded command sequence. Because the chip operating system downloaded command sequence can be send to a plurality of user cards in batch in the embodiment of the present invention, the plurality of user cards can download the chip operating system so as to complete the card issue operation of the user card in batch. Comparing with the solution that the card issue is completed by programming of developers in the prior art, the embodiment of the present invention improves card issue efficiency by adapting the card issuing device.

The embodiment 5 of the present invention mainly is used in all kinds of required technical solutions such as card issue of public transportation system (transportation card), card issue of bank and card issue of access control system, etc.

According to the description of the embodiments above, those skilled in the art can appreciate that the invention can be realized with software and necessary general hardware, of course, by only hardware as well. However, the former way is the preferred embodiment in most cases. Based on such appreciation, the nature of the technical solution of the present invention or the part contributed to the prior art can be presented in form of software product. The software product can be stored in readable storage medium, such as floppy disc, hard disk or compact disk of the computer, etc; the software product includes a plurality of instructions which can use a computer device, i.e. a personal computer, a server, or a network device, etc., to execute the method described in respective embodiments of the present invention.

Above description is only to illustrate the preferred embodiments but not to limit the present invention. To those skilled in the art, various alterations and changes can be made to the present invention. The scope of protection defined in claims shall comprise any modification, equivalent substitution and improvement within the spirit and principle of the present invention.

The invention claimed is:

1. A secure card issuing method, characterized in that said method comprises following steps:
   (1) a card issuing device receiving identity information input by a user, and verifying the identity information by a managing card;
   (2) after the managing card verifying the identity information successfully, the card issuing device performing interactive verification with the managing card;
   (3) after the card issuing device performing interactive verification with the managing card successfully, the card issuing device obtaining a session key from the managing card;
   (4) the card issuing device processing chip operating system downloaded command file data of the managing card with the session key;
   (5) the card issuing device parsing the chip operating system downloaded command file data, to obtain a chip operating system downloaded command sequence;
   (6) the card issuing device sending the chip operating system downloaded command sequence to at least one user card, and instructing the at least one user card to download the chip operating system according to the chip operating system downloaded command sequence; and
   (7) the card issuing device activating the chip operating system downloaded to the at least one user card,
   in which Step (7) comprises following steps:
   (7.1) the card issuing device sending the random number generated by the user card to the managing card;
   (7.2) when available times of an internal activating verification key of the user card is larger than 0, the managing card using the internal activating verification key to encrypt the random number and sending the encrypted random number to the user card by the card issuing device; and the available times of the internal activating verification key minus 1 simultaneously;
   (7.3) when available times of an external activating verification key of the user card is larger than 0, the user card performing decryption with the external activating verification key to obtain the random number; and the available times of the external activating verification key minus 1 simultaneously; and
   (7.4) when the random number obtained by decryption performed by the user card is identical to the generated random number, the user card controlling the chip operating system to be in activating status.

2. The method of claim 1, wherein Step (4) specifically comprises following steps:
   (4.1) the card issuing device encrypting a configuration file read command with the session key and sending the encrypted configuration file read command to the managing card;
   (4.2) the managing card decrypting the obtained configuration file read command with the session key and obtaining configuration file data according to the configuration file read command;
   (4.3) the managing card encrypting the configuration file data with the session key and sending the encrypted configuration file data to the card issuing device;
   (4.4) the card issuing device obtaining a chip operating system downloaded command file list in the configuration file data by decryption with the session key; and
   (4.5) reading the chip operating system downloaded command file data from the managing card by using the session key according to the sequence of the chip operating system downloaded command file list.

3. The method of claim 1, wherein before Step (6), the method further comprises
   the card issuing device encrypting the read command of user card verification command with the session key and sending the encrypted read command to the managing card;
   the managing card decrypting the received read command of the user card verification command with the session key and reading user card verification command file according to the read command;
   the managing card encrypting the user card verification command file with the session key and sending the encrypted user card verification command file to the card issuing device;
   the card issuing device obtaining the user card verification command file by decryption with the session key and verifying the user card verification command file; and
   the card issuing device reading the chip operating system downloaded command file data from the managing card is that the card issuing device reads the chip operating system downloaded command file from the managing card after the user card verification command file is verified successfully.

4. The method of claim 1, wherein before Step (6), the method further comprises
   the card issuing device sending a random number generated by the user card to the managing card;
   the managing card encrypting the random number by using an internal verification key and sending the encrypted random number to the user card by the card issuing device;
   the user card decrypting the received encrypted random number with an external verification key to obtain the random number and determines whether the random number obtained by decryption is identical to the generated random number; and
   the user card downloading the chip operating system according to the chip operating system downloaded command sequence is that, when the random number obtained by decryption is identical to the generated random number, the user card downloading the chip operating system according to the chip operating system downloaded command sequence.

5. The method of claim 1, wherein Step (3) comprises following steps:
   (3.1) the managing card generating session key, encrypting the session key with card issuing private key and sending the encrypted session key to the card issuing device; and
   (3.2) the card issuing device performing decryption with card issuing public key to obtain the session key.

6. A card issuing device, characterized in that said device comprises
   a checking unit configured to receive identity information input by a user and verify the identity information by a managing card;

a first verifying unit configured to perform interactive verification between the card issuing device and the managing card after the managing card verifies the identity information successfully;

a second obtaining unit configured to obtain session key from the managing card after the interactive verification between the card issuing device and the managing card is successful;

a first obtaining unit comprising a processing module configured to process chip operating system downloaded command file data in the managing card with the session key and a parsing module configured to parse chip operating system downloaded command file data to obtain a chip operating system downloaded command sequence;

a sending unit configured to successively send the chip operating system downloaded command sequence to at least one user card and instruct the at least one user card to download chip operating system according to the chip operating system downloaded command sequence; and an activating unit configured to activate the chip operating system downloaded to the at least one user card, in which the activating unit comprises a sending module configured to send the random number generated by the user card to the managing card, wherein when available times of internal activating verification key is larger than 0, the managing card encrypts the random number and sends the encrypted random number by the card issuing device to the user card; and the available times of the internal activating verification key minus 1; and when available times of external activating verification key is larger than 0, the user card obtains the random number by the external activating verification key, the available times of the external activating verification key minus 1 simultaneously; when the random number obtained by decryption is identical to the generated random number, the user card controls the chip operating system to be in activating status.

7. The card issuing device of claim 6, wherein a reading module comprises a sub-encrypting module configured to encrypt configuration file read command with the session key and send the encrypted configuration file read command to the managing card; in which the managing card performs decryption with the session key to obtain the configuration file read command and obtains the configuration file data according to the configuration file read command; and the managing card further performs encryption with the session key and sending the encrypted configuration file data to the card issuing device;

a sub-decrypting module configured to perform decryption with the session key to obtain a chip operating system downloaded command file list in the configuration file data; and a sub-reading module configured to, according to arrangement sequence of the chip operating system downloaded command file list, read the chip operating system downloaded command file data from the managing card by using the session key.

8. The card issuing device of claim 6, further comprising an encrypting unit configured to encrypt read command of user card verification command with the session key and send the encrypted read command to the managing card, in which the managing card performs decryption with the session key to obtain the read command of the user card verification command, reads the user card verification command file according to the read command; and the managing card encrypts the user card verification command file with the session key and sends the encrypted user card verification command file to the card issuing device;

a decrypting unit configured to perform decryption with the session key to obtain the user card verification command file; and a second verification unit configured to verify the user card verification command file, after the user card verification command file is verified successfully, the reading module reads the chip operating system downloaded command file data from the managing card.

9. The card issuing device of claim 6, wherein the sending unit is further configured to send the random number generated by the user card to the managing card;

the managing card encrypts the random number with internal verification key and sends the encrypted random number to the user card by the card issuing device; and the user card performs decryption with external verification key and determines whether the random number obtained by decryption is identical to the generated random number; and when the random number obtained by decryption is identical to the generated random number, the user card downloads the chip operating system according to the chip operating system downloaded command sequence.

10. The card issuing device of claim 6, wherein the second obtaining unit comprises a receiving module configured to receive the session key which is encrypted by the managing card with a card issuing private key, in which the session key is generated by the managing card; and a decrypting module configured to perform decryption with a card issuing public key to obtain the session key.

11. A secure card issuing system, characterized in that said system comprises a card issuing device, a managing card, and at least one user card, in which the managing card is configured to provide a chip operating system downloaded command sequence, verify identity information input by a user and perform interactive verification with the card issuing device;

the card issuing device is configured to receive the identity information input by the user and verify the identity information by the managing card; after the identity information is verified successfully by the managing card, the card issuing device is configured to perform interactive verification with the managing card; after the interactive verification between the card issuing device and the managing card is successful, the card issuing device is configured to obtain session key from the managing card; the card issuing device is configured to process chip operating system downloaded command file data in the managing card with the session key and parse the chip operating system downloaded command file data to obtain the chip operating system downloaded command sequence; and the card issuing device is configured to send the chip operating system downloaded command sequence to at least one user card and activate chip operating system of the at least one user card; and the user card is configured to download the chip operating system according to the chip operating system downloaded command sequence, in which in the process of interactive verification between the card issuing device and the managing card, the managing card realizes functions via modules of a first random number generating module configured to generate a random number;

a first data encrypting module configured to encrypt the random number and send the encrypted random number to the card issuing device;

a first data decrypting module configured to decrypt encrypted data returned by the card issuing device, in which the encrypted data returned by the card issuing device is obtained by encrypting the decrypted data of the first data encrypting module; and a first determining module configured to determine whether the data obtained by decryption of the first data decrypting module is identical to the random number generated by the first random number generating module, if yes, the verification is successful.

12. The secure card issuing system of claim 11, wherein the managing card comprises
   a first interface module configured to connect the card issuing device and the managing card and receive the identity information input by the user which is sent from the card issuing device;
   a first determining module configured to determine whether the identity information input by the user is identical to the identity information of the managing card; and
   a first data encrypting module configured to, after the interactive verification between the card issuing device and the managing card is successful, encrypt the session key with card issuing private key and send the encrypted session key to the card issuing device such that the card issuing device obtains the session key from the managing card; and the card issuing device decrypts the chip operating system downloaded command file data encrypted by the managing card with the session key.

13. The secure card issuing system of claim 12, wherein the managing card further comprises
   a first data decrypting module configured to perform decryption to obtain configuration read command and obtain configuration file data according to the configuration file read command, in which
   the first interface module of the managing card encrypts the configuration file data with the session key and sends the encrypted configuration file data to the card issuing device.

14. The secure card issuing system of claim 12, wherein the managing card further comprises
   a first data computing module configured to encrypt data with the session key and send the encrypted data to the card issuing device and compute verification information; and
   a first verifying module configured to verify the verification information after receiving the encrypted data and verification information sent from the card issuing device.

15. The secure card issuing system of claim 12, wherein the managing card further comprises
   a first storing module configured to store available times of internal activating verification key and permit activating if the available times of the internal activating verification key is larger than 0.

16. The secure card issuing system of claim 11, wherein the card issuing device comprises
   a first receiving module configured to receive the identity information input by the user;
   a second interface module configured to connect the card issuing device and the managing card, send the identity information to the managing card for verification; and
   after the managing card verifies the identity information successfully, the card issuing device performing interactive verification with the managing card;
   a command parsing module configured to parse the chip operating system downloaded command file data to obtain the chip operating system downloaded command sequence;
   a command reading module configured to read the chip operating system downloaded command sequence obtained by the parsing of the command parsing module; and
   a third interface module configured to connect the card issuing device and the user card, send the chip operating system downloaded command sequence to the user card and activate the chip operating system downloaded to the at least one user card.

17. The secure card issuing system of claim 11, wherein the user card comprises
   a fourth interface module configured to connect the card issuing device and the user card; and
   an information writing module configured to download the chip operating system according to the chip operating system downloaded command sequence.

* * * * *